(12) United States Patent
Wood et al.

(10) Patent No.: US 6,680,823 B2
(45) Date of Patent: Jan. 20, 2004

(54) MOVEABLE OUTER STOP

(75) Inventors: Roy L. Wood, Yukon, OK (US); John D. Stricklin, Oklahoma City, OK (US); Nigel F. Misso, Yukon, OK (US); Steve S. Eckerd, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/885,340

(22) Filed: Jun. 18, 2001

(65) Prior Publication Data

US 2002/0093770 A1 Jul. 18, 2002

Related U.S. Application Data

(60) Provisional application No. 60/263,037, filed on Jan. 18, 2001.

(51) Int. Cl.$^7$ .................................................. G11B 5/55
(52) U.S. Cl. ................................................. 360/265.1
(58) Field of Search ........................... 360/256.1, 265.1, 360/256, 256.4, 267.6

(56) References Cited

U.S. PATENT DOCUMENTS

| | | | |
|---|---|---|---|
| 4,635,141 A | | 1/1987 | Coulter |
| 4,833,550 A | * | 5/1989 | Takizawa et al. ............. 360/75 |
| 4,890,176 A | | 12/1989 | Casey et al. |
| 4,937,692 A | | 6/1990 | Okutsu |
| 4,949,206 A | | 8/1990 | Phillips et al. |
| 5,081,552 A | | 1/1992 | Glaser et al. |
| 5,095,395 A | * | 3/1992 | Wakatsuki ............... 360/256.3 |
| 5,134,608 A | | 7/1992 | Strickler et al. |
| 5,162,955 A | | 11/1992 | Burdenko |
| 5,224,000 A | | 6/1993 | Casey et al. |
| 5,262,913 A | | 11/1993 | Stram et al. |
| 5,363,261 A | * | 11/1994 | Eckberg et al. .......... 360/256.2 |
| 5,381,290 A | * | 1/1995 | Cheng ..................... 360/256.3 |
| 5,446,606 A | * | 8/1995 | Brunner et al. ............... 360/75 |
| 5,555,146 A | * | 9/1996 | Hickox et al. ........... 360/256.4 |
| 5,600,516 A | | 2/1997 | Phillips et al. |
| 5,636,090 A | * | 6/1997 | Boigenzahn et al. .... 360/256.4 |
| 5,715,119 A | * | 2/1998 | Williams et al. ......... 360/265.1 |
| 5,717,544 A | | 2/1998 | Michael |
| 5,745,325 A | | 4/1998 | Matsumoto |
| 5,793,572 A | * | 8/1998 | Lalouette et al. ........ 360/256.1 |
| 5,826,325 A | | 10/1998 | Price et al. |
| 5,973,888 A | | 10/1999 | Chawanya et al. |
| 5,982,587 A | * | 11/1999 | Alagheband et al. ........ 360/256 |
| 6,011,672 A | * | 1/2000 | Matsumoto ............... 360/265.1 |
| 6,028,744 A | * | 2/2000 | Amirkiai et al. ......... 360/265.1 |
| 6,034,841 A | * | 3/2000 | Albrecht et al. ......... 360/97.01 |
| 6,115,222 A | | 9/2000 | Andrews et al. |
| 6,125,017 A | | 9/2000 | Misso et al. |
| 6,134,086 A | * | 10/2000 | Kim ........................... 360/256 |
| 6,185,074 B1 | * | 2/2001 | Wang et al. ............. 360/256.4 |
| 6,206,581 B1 | * | 3/2001 | Driscoll et al. ................ 385/78 |
| 6,501,624 B1 | * | 12/2002 | Gillis et al. ............. 360/256.3 |

\* cited by examiner

*Primary Examiner*—Brian E. Miller
(74) *Attorney, Agent, or Firm*—Derek J. Berger; Randall K. McCarthy

(57) ABSTRACT

An end stop assembly for limiting the travel of an actuator in a disc drive, the actuator pivotally supported by an enclosure for movement of a read/write head in data reading and writing relationship to a data disc. The end stop assembly comprises a base plate fixedly positioned within the enclosure, a post extending upward from the base plate and a cantilevered arm extending outward from the post. The arm comprises a proximal end connecting the arm to the post and a distal end for providing contacting engagement with the actuator. Furthermore, the cantilevered arm is displaceable in a rotational direction substantially about the post and deformable in a direction substantially along its longitudinal axis.

15 Claims, 4 Drawing Sheets

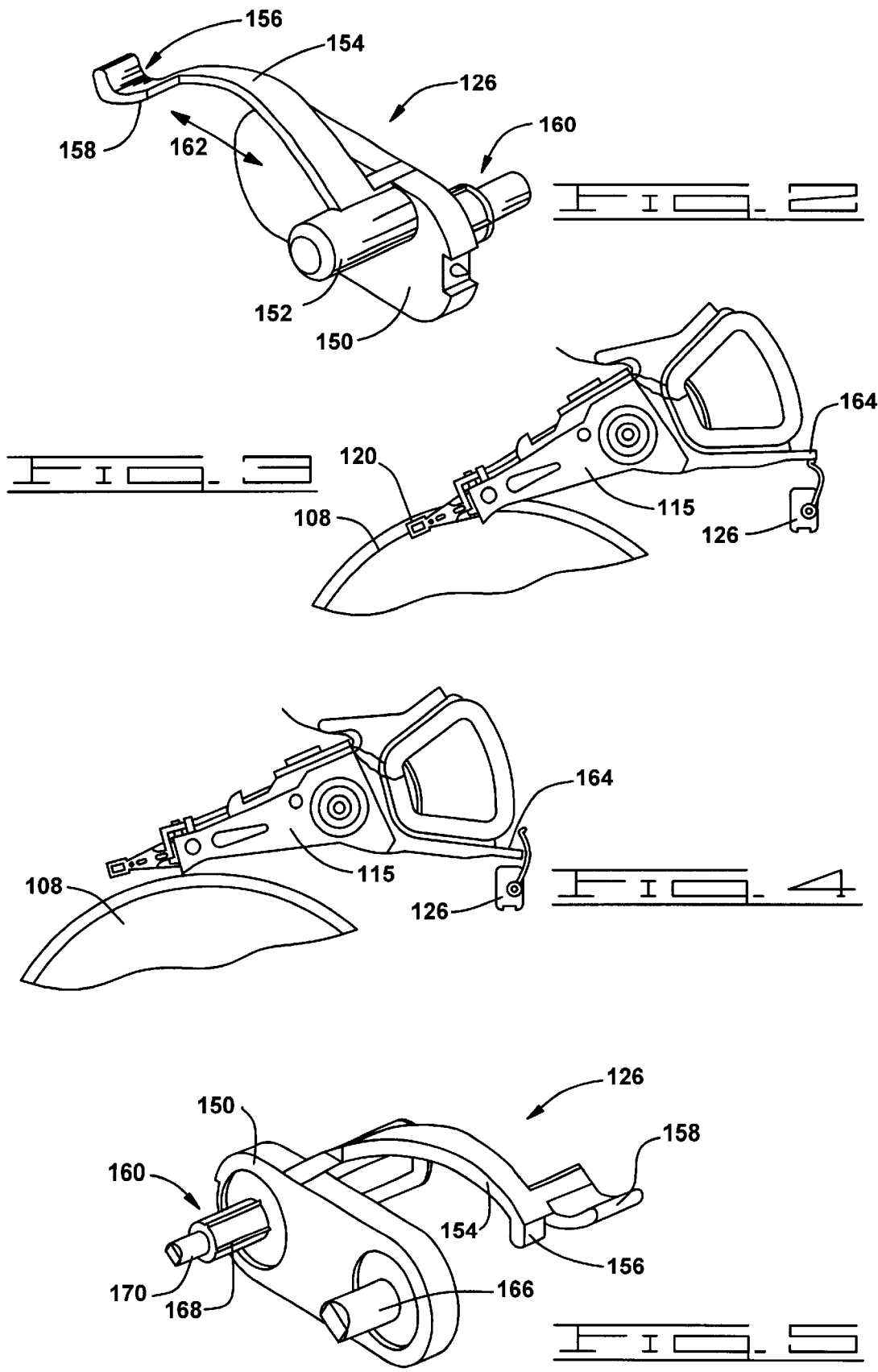

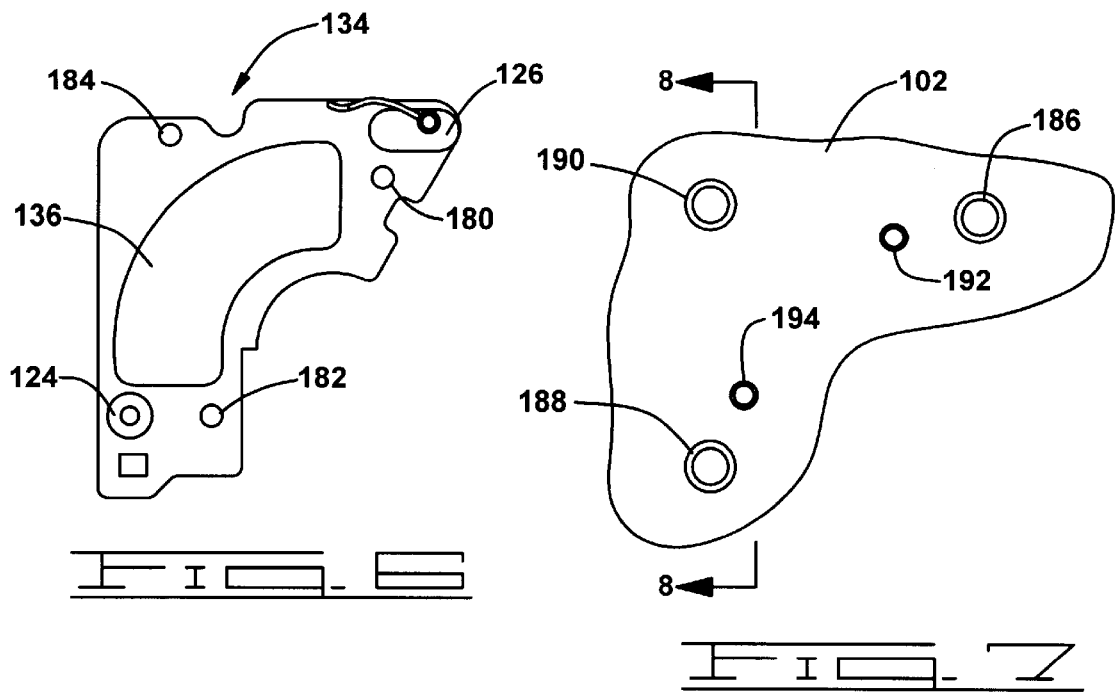
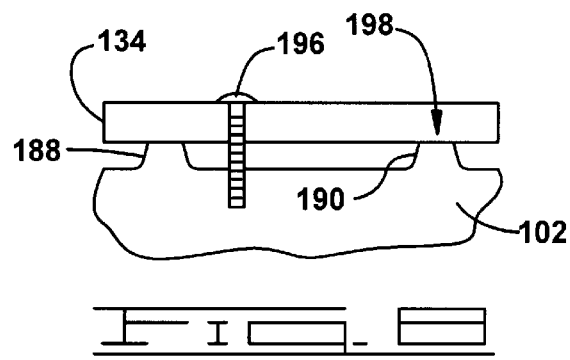
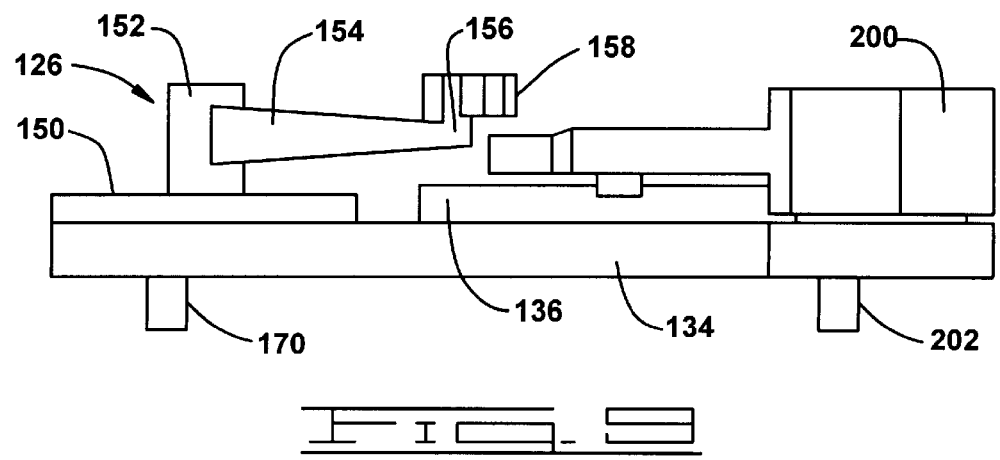

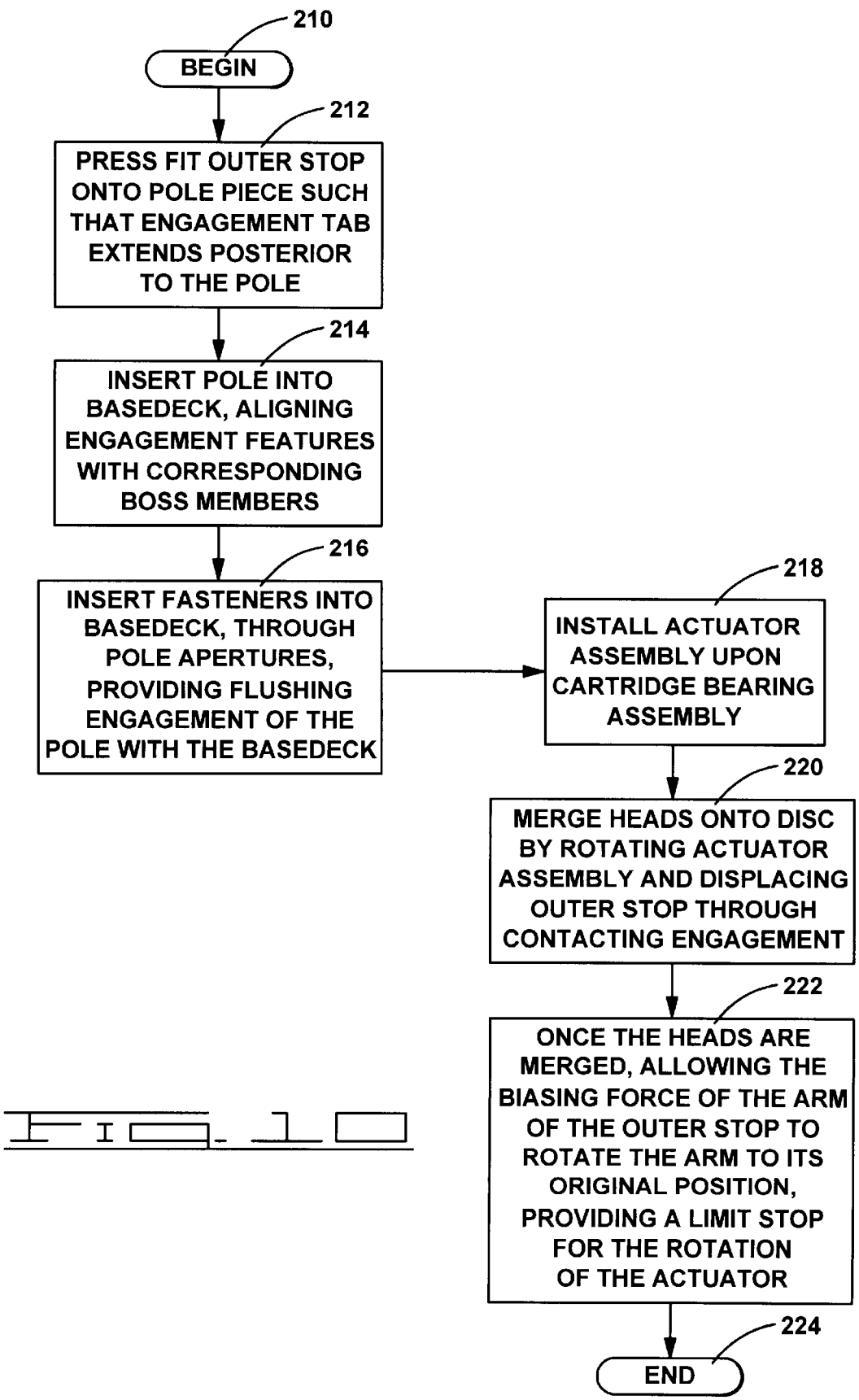

MOVEABLE OUTER STOP

RELATED APPLICATIONS

This application claims the benefit of U.S. Provisional Application No. 60/263,037 entitled MOVEABLE OUTER STOP, filed Jan. 18, 2001.

FIELD OF THE INVENTION

The present invention relates generally to the field of disc drive data storage devices, and more particularly but not by way of limitation, to crash stops for limiting the movement of an actuator of the disc drive and the installation of various components onto a basedeck to provide flushing engagement thereon.

BACKGROUND OF THE INVENTION

Modern disc drives are commonly used in a multitude of computer environments, ranging from super computers to notebook computers, to store large amounts of data in a form that is readily available to an end user. Typically, a disc drive has one or more magnetic discs that are rotated by a spindle motor at a constant high speed. Each disc has a data storage surface divided into a series of generally concentric data tracks radially spaced across a band having an inner diameter and an outer diameter. The data is stored within the data tracks on the disc surfaces in the form of magnetic flux transitions. The flux transitions are induced by an array of read/write heads. Typically, each data track is divided into a number of data sectors where data is stored in fixed size data blocks.

The read/write head includes an interactive element such as a magnetic transducer. The interactive element senses the magnetic transitions on a selected data track to read the data stored on the track. Alternatively, the interactive element transmits an electrical signal that induces magnetic transitions on the selected data track to write data to the track.

Each of the read/write heads is mounted to a rotary actuator arm and is selectively positioned by the actuator arm over a pre-selected data track of the disc to either read data from or write data to the track. The read/write head includes a slider assembly having an air bearing surface that, in response to air currents caused by rotation of the disc, causes the head to fly adjacent to the disc surface with a desired gap separating the read/write head and the corresponding disc.

Typically, multiple center-open discs and spacer rings are alternately stacked on a spindle motor hub. The hub, defining the core of the stack, serves to align the discs and spacer rings around a common axis. Collectively, the discs, spacer rings and spindle motor hub define a disc pack assembly. The surfaces of the stacked discs are accessed by an actuator assembly which includes the read/write heads and the complementary stack of actuator arms. The actuator assembly also includes head wires which conduct electrical signals from the read/write heads to a flex circuit connector mounted to a disc drive base deck.

When the disc drive is not in use, the read/write heads are brought to rest in a landing zone which is separate from the data storage locations of the discs. The landing zone provides a non-data storage location on each of the disc surfaces where the read/write heads are positioned before the rotational velocity of the spinning discs decrease below a threshold velocity which sustains the air bearing. The landing zone is typically located near the inner diameter of the discs.

A continuing trend in the industry is the simultaneous reduction in size and increase in data storage capacity and processing speed of modern disc drives. As a result, the discs of modern drives increasingly have smaller diameters and tighter disc-to-disc spacings. Although providing increasing amounts of storage capacity, narrow vertical spacing of the discs gives rise to a problem of increased sensitivity to operational vibrations and to external mechanical shock. Additionally, as disc drives continue to decrease in size, smaller heads, thinner gimbal assemblies continue to be incorporated into these drives. Faster seek times also demand increased velocity of the actuator assembly. These factors significantly increase the need to protect the disc drives from incidental contact between the actuator arm/gimbal assemblies and the disc surface.

The requirement for these non-data storage locations on the disc works counter to the general trend for ever increasing data storage capacity. As a result, it is necessary to limit the size of the non-data zones, and to precisely control the extent of actuator travel relative to the non-data zones. Otherwise, an actuator that travels beyond the desired extent of radial travel likely results in damage to the read/write head. The inner extent of radial travel allows the read/write head to travel inwardly past the inner most data track to the landing zone where the read/write head can be parked on the disc surface when the disc drive is non-operational. Inward travel beyond this inner extent can result in damaging contact of the read/write head with the spindle motor hub. The outer extent of radial travel allows the read/write head to access the outermost data track. Outward travel beyond this outer extent of travel can result in the read/write head moving beyond the outer edge of the data disc where there is no sustaining airflow, causing damage to the read/write heads which can contact one another or the spinning discs.

As requirements for faster data processing demand ever increasing actuator speed and associated deceleration rates during seek cycles, the likelihood of overshooting the target track increases. Such an overshoot near the extents of travel can result in damage to the read/write heads. Also, unfortunately, control circuit errors are known to create "runaway" conditions of the actuator wherein the actuator fails to decelerate at the appointed time. To protect the read/write heads from catastrophic failure, it is well known and practiced in the art to employ positive stops that limit the actuator travel to locations only between the desired extents of travel.

In providing such a positive stop, or end stop, it is necessary that the end stop decelerate the actuator quickly and in a short distance, but without damaging the actuator assembly. The maximum deceleration is limited to that which is below the acceleration force limits of the actuator assembly, such as below the deceleration force that would cause the transducer to deflect away from a supporting member and thereby either contact the data storage surface or deform the end stop. As a result, numerous attempts to provide a controlled braking impulse to the actuator have been made.

Applying a general dampened braking impulse is known in the art, such as by the use of an air cylinder type dampener as taught by U.S. Pat. No. 4,937,692 issued to Okutsu. In this approach, fluid is displaced by a piston that is responsive to a stop member that obstructs the movement of the actuator beyond the desired extent of travel. The dampened braking impulse provides a resistive force for decelerating the actuator, but without the typical sudden deceleration of a rigid stop member, such as a rigid stop pin.

Manufacturability and cost constraints have urged the art toward more simple mechanisms. The use of a resilient pad is widely known, such as that of the teaching of U.S. Pat. No. 4,890,176 issued to Casey et al. and assigned to the assignee of the present invention. Spring members, too, are widely used in the art, such as that according to the teachings of U.S. Pat. No. 4,635,141 issued to Hazebrouck.

The primary objection to resilient pads and springs is the relatively long stopping distance necessary to compress the response member sufficiently so as to develop an effective braking force. One attempted solution is to provide cantilevered members that elastically deflect in response to the impact force of the actuator, such as is taught by U.S. Pat. No. 5,134,608 issued to Strickler et al. and U.S. Pat. No. 5,600,516 issued to Phillips et al. and assigned to assignee of the present invention.

Another objection to resilient pads or other fixed objects is the inherent problems relating to the loading and unloading of the read/write heads on to and off of the discs. If the end stop is fixedly mounted to limit the movement of the actuator arm, the end stop must be installed after the heads have been loaded (merged) onto the discs. Furthermore, in order to unload the heads (de-merge), the outer stop must then be physically removed. It is well known in the art to provide an end stop capable of being manually displaced from the rotational path of the actuator to allow the loading of the heads on the disc, as taught by U.S. Pat. No. 5,134,608 issued to Strickler et al.

The end stop must be capable of providing an effective deceleration for an actuator, limiting the movement of the head in such a manner to prevent any deleterious effects. Furthermore, the end stop must be capable of allowing for the merge and de-merge of the heads.

Another problem often encountered with disc drives is during the assembly process and is the orientation of the various components as they are installed onto the basedeck. Furthermore, the order in which components may be installed in the drive directly affects the speed of assembly. Often times, various components cannot be installed until other components are initially secured within the drive or to the basedeck. A common problem occurs during the installation of the actuator assembly and the outer stop onto the basedeck. As the outer stop prohibits movement beyond the outer extent, the actuator assembly must be installed first and then the outer stop attached, often times requiring additional installation steps, slowing down the assembly process.

A continuing trend in the industry is the development of an assembly method commonly referred to as "top down assembly" where the installation begins with the basedeck and the components are continuously inserted thereon in a prescribed order. When the outer stop must be installed after the installation of the actuator assembly, this provides for an inefficient assembly process. Furthermore, there is a trend in the industry to reduce the number of individual components assembled into the drive. One particular solution is the pre-installation of components onto other components prior to their installation within the basedeck assembly.

Another problem associated with the assembly of multiple components in a disc drive is the spatial relationship between the various components. Many of these components synchronously work together to provide the capabilities of the drive and they must be positioned relative to each other within specific tolerance ranges. It is well known to orient multiple components relative to a fixed reference, such as the basedeck.

Another problem commonly found during disc drive assembly is the installation of the various components and their flushing engagement with other components, such as with the basedeck. To compensate for manufacturing tolerances, boss members may be installed on the basedeck for providing engagement with the various components. A problem exists in that when the components are secured to the basedeck, it may cause the mechanical component to displace from flushing engagement with the boss member and may produce a bowing effect within the component itself.

As such, within the industry there currently exists a need in the art for an end stop capable of allowing the merging and de-merging of the heads of the actuator while the outer stop is maintained in a fixed position and providing a proper limiting force for the actuator itself. There also exists a need in the industry to provide an outer stop that allows the installation of the actuator assembly after the outer stop has been installed. Furthermore, there is a need in the art to provide for easier assembly of a disc drive through the installation of fewer individual components and providing for these fewer components to be referenced relative to common reference points. Finally, there exists a continuing need for the improved installation of the various components within the drive, consonant with the top-down assembly and providing for the components to be flushingly engaged with the basedeck.

SUMMARY OF THE INVENTION

The present invention provides a moveable outer stop for a disc drive assembly, wherein the disc drive assembly has a disc pack with a data storage disc having a landing zone and a data storage zone thereon. The disc pack includes a spindle motor for rotating the disc. An actuator in the disc drive assembly is rotatably supported in a plane parallel to that of the disc and supports an array of read/write heads in a radial movement across the disc in data reading and writing relationship to the disc.

The disc drive has a voice coil motor that operably moves the actuator to move the read/write heads radially between the parked location and the data storage location. The parked location provides a landing zone for the read/write heads when the drive is non-operational. The voice coil motor includes a magnet assembly having a pair of opposing magnet members supported by a pair of opposing poles. In moving the actuator it is advantageous to constrain movement of the read/write heads to positions within an inner and an outer extent of travel, which includes the data storage locations and the landing zone. In preventing movement of the read/write heads beyond the outer extent, an end stop, or outer stop, is provided.

The outer stop comprises a base plate fixedly positioned within the basedeck, attached to the pole piece with a post extending upward therefrom. A cantilevered arm extends outward from the post, the arm comprising a proximal end connecting the arm to the post and a distal end for contact engagement with the actuator. The distal end is capable receiving a displacement force from the actuator as the heads are merged onto the discs and also receiving a compression force from the actuator when the heads are rotated past the outer extent of the disc. The cantilevered arm is displaceable in a rotational direction substantially about the post and deformable in a direction substantially along the its longitudinal axis. Furthermore, the arm is composed of a compressible curved beam, deformable in response to the compression force.

The arm is also rotationally displaceable in response to a displacement force applied to the distal end of the arm, causing the arm to be rotationally displaced about the post, allowing the actuator full rotation without contacting engagement with the distal end of the arm. Thereby, when the heads are merged or de-merged, the end stop of the present invention may be effectively displaced while the actuator passes the outer extent, and the arm is then biased back to its original position upon cessation of the displacement force.

Furthermore, when the actuator rotates into contacting engagement with the outer stop while the heads are over the discs, the arm limits the movement of the actuator through its deformability along its longitudinal axis and when the actuator rotates into contact engagement with outer stop prior to the heads being merged, the actuator exerts a displacement force, displacing the arm and allowing the actuator assembly to freely rotate, positioning the heads over the discs. Whereupon, a biasing force returns the end stop to its limiting position once the heads are merged.

Another aspect of the present invention is that the end stop is fixedly attached to a pole piece adjacent the voice coil magnet. During the top-down assembly process, the pole piece is positioned onto the basedeck of the drive, with the end stop already attached thereon. On the posterior side of the end stop, to facilitate flushing attachment to the pole piece and the pole piece to the basedeck, are disposed multiple engagement features. A first engagement feature engages a first receiving member in the pole piece, whereas a second engagement feature is disposed in a second receiving member having an aperture disposed therein. The second engagement feature not only engages the second receiving member, but also extends through the aperture for contacting engagement with a boss element on the basedeck.

The pole also provides a third engagement feature disposed on its posterior side. This engagement feature may be provided by a latch mechanism attached to the pole piece having an engagement feature extending therethrough, or the pole piece may be designed to have an engagement feature already disposed thereon. Irrespective, the pole piece itself has at least two engagement features projecting from its posterior side. During installation, the engagement features of the pole piece are placed on boss members projecting upward from the basedeck.

After the pole piece has been properly mounted, fasteners are inserted through the pole piece into the basedeck. The receiving voids for receiving the fasteners are strategically disposed in close proximity to the boss members whereby the insertion of specific fasteners provide the pole piece flushing engagement with the basedeck.

Wherein, the actuator assembly may then be installed into the drive upon a cartridge bearing assembly extending from the basedeck. The outer stop may then be subjected to a displacement force created by the actuator contacting the distal end of the arm, displacing the arm and allowing the actuator assembly to rotate about the cartridge bearing assembly, merging the heads onto the disc surface.

These and other advantages and features of the present invention will be apparent from the following description when read in conjunction with the drawings and appended claims.

BRIEF DESCRIPTION OF THE DRAWINGS

FIG. 2 is a perspective view of the end stop of the present invention.

FIG. 3 is a plan view of the actuator assembly in contacting engagement with the end stop of the FIG. 1.

FIG. 4 is a plan view of the actuator assembly prior to merging the heads onto the disc.

FIG. 5 is a perspective view of the posterior side of the preferred embodiment of the end stop of the present invention.

FIG. 6 is a plan view of a pole piece having the outer stop attached thereto.

FIG. 7 is a plan view of a portion of a basedeck having a plurality of bosses and fastener holes for the installation of the outer stop onto the basedeck.

FIG. 8 is a side view of the basedeck along the line VIII of FIG. 7 with the installation of a pole piece and fastener included thereon.

FIG. 9 is a side view of the pole piece having an outer stop, latch, and voice coil magnet attached thereto.

FIG. 10 is a flow-chart providing the steps taken to assemble and operate the outer stop.

DETAILED DESCRIPTION

Figure 1:
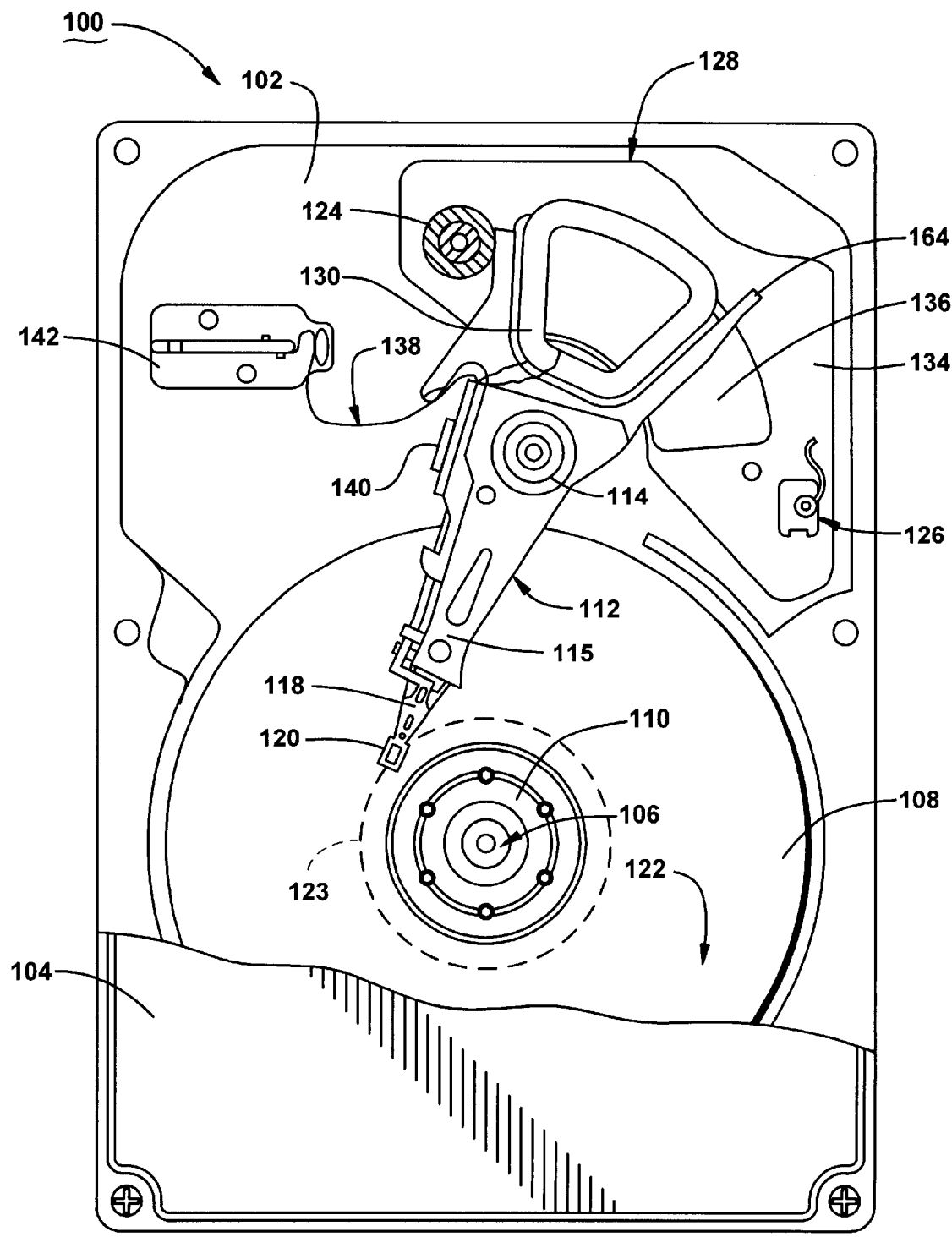
FIG. 1 is a plan view of a disc drive incorporating an end stop constructed in accordance with the preferred embodiments of the present invention.

Referring to the drawings in general, and more particularly to FIG. 1, shown therein is a plan view of a disc drive 100 constructed in accordance with the present invention. The disc drive 100 includes a base deck 102 to which various disc drive components are mounted, and a cover 104 which together with the base deck 102 provide a sealed environment for the drive 100. The cover 104 is shown in a partial cut-away fashion to expose selected components of interest. It will be understood that numerous details of construction of the disc drive 100 are not included in the following description because they are believed well known to those skilled in the art and are believe to be unnecessary for the purpose of describing the present invention.

Mounted to the base deck 102 is a spindle motor 106 to which a plurality of discs 108 are mounted and secured by a clamp ring 110 for rotation at a constant high speed. Adjacent the discs 108 is an actuator assembly 112 which rotates about a pivot bearing assembly 114 in a plane parallel to the discs 108. The actuator assembly 112 includes an actuator 115 that is supported by the pivot bearing assembly 114. The actuator 115 has actuator arms 116 (only one shown) that support load arm assemblies 118. The load arm assemblies 118, in turn, support the read/write head 120 adjacent a surface of one of the discs 108 and maintain the head 120 in a data reading and writing spatial relationship by a conventional slider assembly (not shown) which supports the read/write head 120 in response to air currents generated by the spinning discs 108 during operation of the disc drive 100.

Each of the discs 108 has a data storage location with a data recording surface 122 divided into concentric circular data tracks (not shown), and the read/write heads 120 are positionably located adjacent data tracks to read data from or write data to the tracks. The data recording surface 122 is bounded at an inner extent by a circular landing zone 123 where the read/write heads 120 can come to rest against the discs 108 at times when the disc drive is deactivated. It is advantageous to limit the pivotal motion of the actuator 115 so as to constrain radial position of the read/write heads 120 to locations within the data recording surface 122. Otherwise the read/write heads 120 can easily be damaged if they inadvertently travel off the edge of the discs 108 or into the spindle motor 106.

It is well known in the art to provide positive stops, or crash stops, to limit the pivoting motion of the actuator 115. An inner extent crash stop 124 prevents the heads from contacting the spindle motor 110 and allows the heads 120 to be positioned over the inner extent. An outer extent crash stop 126 of the present invention (also referred to herein as an "end stop assembly," an "end stop" and an "outer stop") provides the required limiting of the actuator 115 on the outer extent, but also provides for easier manufacturing and testing of the drive 100 by allowing the merging and de-merging of the heads with the end stop 126 already installed thereon.

The heads 118 are positioned over the discs by a voice coil motor (VCM) 128. The VCM 128 is composed of an actuator coil 130 supported at the distal end of the actuator assembly 112 and immersed in a magnetic field generated by a magnet assembly. A magnetically permeable flux path, such as provided by a pair of steel plates, also referred to as a pole 134, completes the magnetic circuit of the VCM 128. In a preferred embodiment, as shown in FIG. 1, a bottom pole 134 is attached to the base deck 102, allowing the components disposed therein to be referenced to other components affixed to the basedeck 102. Furthermore, in FIG. 1, the top pole has been removed, exposing the voice coil 130, crash stop 124, voice coil magnet 136 and end stop 126 of the present invention.

When controlled current is passed through the actuator coil 130, an electromagnetic field is set up which interacts with the magnetic circuit of the magnet assembly to cause the actuator coil 130 to move relative to the magnets 136 in accordance with the well-known Lorentz relationship. As the actuator coil 130 moves, the actuator 115 pivots about the pivot bearing assembly 114 causing the actuator arms 116 to move the read/write heads 120 adjacent to, and radially across, the discs 108.

To provide the requisite electrical conduction paths between the read/write head 120 and the disc drive read/write circuitry (not shown), head wires (not separately shown) are routed on the actuator assembly 112 from the read/write heads 120, along the load arm assemblies 118 and the actuator arms 116, to a flex circuit 138. The head wires are secured by way of a suitable soldering process to corresponding pads of a printed circuit board (PCB) 140. In turn, the flux circuit 138 is connected to a flex circuit bracket 142 in a conventional manner which, in turn, is connected through the base deck 102 to a disc drive PCB (not shown) mounted to the underside of the base deck 102. The disc drive PCB provides the disc drive read/write circuitry which controls the operation of the read/write heads 120, as well as other interface and control circuitry for the disc drive 100.

FIG. 2 illustrates a perspective view of the moveable outer stop 126 of the present invention. More specifically, the outer stop has a base plate 150 having a central post 152 outwardly extending therefrom. Connected to the post 152 is a cantilevered arm 154 comprising an arch spring that has a contact surface 156 at its distal end. In the preferred embodiment, the contact surface also contains a tab portion 158 allowing for the exertion of a displacement force on the arm 154 to rotationally displace the arm about the post 152. Due to the fixed position of the post 152, the arm 154 rotates in an arcuate path. Furthermore, due to the cantilevered design of the arm 154, the arm exerts a biasing force to resist the displacement force and place the contact surface 156 back to its resting position, as shown in FIG. 2. In the preferred embodiment, as illustrated in FIG. 2, the arm 154 has a variable thickness, tapering from a maximum thickness at the proximal end extending from the post 152 to a minimum thickness at the distal end.

Also shown in FIG. 2 is a mounting tab 160 for mounting the end stop 126 to the pole 134 and the basedeck 102. The basedeck also contains a second mounting, not shown, on the posterior side. As discussed further below, these mounting tabs allow the specific orientation of the end stop references to the cartridge bearing assembly 114 of the actuator assembly. Furthermore, the first tab 160 provides direct engagement with the basedeck 102 through the pole 134 and the second tab (not shown) provides engagement solely with the pole 134 to prevent any lateral displacement of the end stop 126. In the preferred embodiment, the outer stop 126 is press fitted to the pole 134 prior to the installation of the pole piece onto the basedeck.

Another aspect of the end stop 126 is the energy absorption characteristics of the arm 154. The contact surface 156 on the distal end of the arm provides for contacting engagement with an outer tab on the distal end of the actuator, designated as element 164 in FIG. 1. When the actuator assembly 112, which rotates about the cartridge bearing assembly 114, reaches the outer extent, the outer tab contacts the end stop 126, it imparts a compression force thereon. The spring arm 154, through arcuately deforming about its longitudinal axis 162, absorbs the compression force, and thus limits the rotation of the actuator assembly. Furthermore, in accordance with the preferred embodiment, the arm should be constructed of a temperature independent material, such as a polyphenylsulfone or polyetherimide.

The moveable outer stop also improves the assembly process by not only allowing for the installation of the actuator assembly after the outer stop but also by reducing the number of separate components to be installed in the drive. The outer stop 126 allows for the installation of the bottom pole 134 having the outer stop assembled thereon, onto the basedeck 102 prior to the installation of the actuator assembly 112. Prior assembly methods require the heads to be merge before the installation of the outer extent limiter and then the individual outer stop is installed onto the pole piece of the basedeck, requiring a second step and more individual components.

With the bottom pole 134 secured to the basedeck 102, the actuator assembly 112 may be inserted onto the cartridge bearing assembly 114, with the heads 120 adjacent the discs. As shown in FIG. 4, the tab 164 is positioned interior the arcuate curvature of the arm 154, over the base plate 150. When the heads are to be loaded, or merged, onto the discs, the actuator assembly 112 rotates counterclockwise about the cartridge bearing assembly 114. The tab 164 contacts the interior arcuate surface of the arm 154, imparting a displacement force thereon. This force overcomes the inherent biasing force of the arm 154 and causes the arm to pivotally rotate about the fixed post 152. As the tab 164 exerts a displacement force, through its rotation about the cartridge bearing assembly 114 into contacting engagement with the distal end of the arm, the arm is rotatably displaced allowing the tab 164 to pass thereby. Once the heads 120 have merged onto the discs 108 and the tab 164 clears the contact portion 156 of the outer stop 126, the biasing force of the arm 154 causes the arm to rotate back to its original position. In returning to this original position, the contact portion 156, prevents the actuator rotating the heads past the outer extent of the disc.

Due to the coil spring characteristics of the arm 154 of the outer stop 126, a displacement force may be asserted against the contact portion 156 or the tab portion 158, rotationally displacing the arm, similar to the displacement created when the heads are merged onto the discs. As the displacement force overcomes the inherent biasing force, the distal end of the arm is positioned outside the rotational path of the actuator, thereby providing the actuator assembly unrestricted rotation past the outer extent, thus allowing the heads to be unloaded (de-merged) from the discs. Furthermore, to merge the heads back onto the discs, the same outer stop displacement process used during the construction of the drive can be utilized, whereby the arm is rotationally displaced by the tab portion of the actuator engaging the interior portion of the distal end of the arm.

FIG. 5 illustrates a perspective view of the posterior side of the moveable outer stop 126, showing the bottom side of the base portion 150 and the two engagement tabs 160 and 166. The first tab 160 has a top half 168 having a larger radius at the end disposed closest to the base 150. At a length approximately equivalent to the length of the second engagement tab 166, the first tab portion begins to taper in diameter. The bottom half 170 of the engagement tab 160 has a specific shape for improved engagement with the basedeck. This bottom half 170 remains substantially circular with the exception of the tip which is composed of a diamond shaped flat surface in a plane parallel with the base deck. The tip portion of the bottom half also comprises tapered edges diagonally extending from the diamond tip to the circular body.

The second engagement tab 166 of the outer stop has an identical shape as the bottom half 170 of the first engagement tab 166. The diamond shape tipped second tab 166 is inserted into a receiving gap in the pole piece. The first engagement tab 160 is inserted through an aperture in the pole whereby the top half 168 contactingly engages the pole and the bottom half 170 extends through the pole for contacting engagement with the basedeck. Furthermore, with respect to the pole piece, the first engagement tab 160 secures the outer stop 126 therein and the second engagement tab 166 prohibits any lateral displacement by the end stop relative to the pole piece 134 or the basedeck 102 when the arm is acted upon by either a compression or a displacement force.

As the present invention provides for the improved ease of disc drive assembly, another aspect is the insertion of the pole piece 134 onto the basedeck with the pole 134 having the end stop 126 already press fitted thereon. FIG. 6 provides an illustration of the pole piece 134 of the present invention prior to its insertion onto the basedeck. The magnet 136 is centrally disposed, and the outer stop is positioned at a first corner and a crash stop 124 is positioned at a second corner of the pole. Furthermore, the pole piece provides for the installation of a latch arm at the third corner, not shown in FIG. 6.

The pole 134 also has two apertures 180, 182 specifically designated for the insertion of fasteners through the pole and into the basedeck 102. Also shown on the pole 134 of FIG. 6 is an aperture 184 wherein a latch mechanism, such as illustrated in FIG. 9, may be fitted on the pole piece. In the preferred embodiment, this latch feature provides an engagement feature, similar to the first engagement tab 160 of the outer stop 126, which extends into contacting engagement with the pole aperture, but also extends posterior to the pole 134.

During assembly of the drive, the pole 134 is positioned onto the basdeck, where the basedeck has a plurality of boss members, such as 186, 188 and 190 receiving the engagement tabs which extend posterior to the pole piece. FIG. 7 shows a partial view of the basedeck 102, having the boss members 186, 188 and 190 and a plurality of apertures 192 and 194 for receiving engagement of the fasteners extending through the pole piece.

The present invention provides for the orientation of the outer stop to be relative to the basedeck and the actuator assembly. The extending tab 160 is inserted into the basedeck, therefore its position on the basedeck is directed by the location of the boss member 186. Furthermore, the position of the actuator assembly relative to the discs and the pole is dictated by the location of the post extending from the basedeck upon which the cartridge bearing assembly 114 is displaced. Therefore, the spatial relationship of the actuator assembly and the outer stop is determined relative to the basedeck, thereby overcoming multiple manufacturing tolerance restrictions in providing a higher degree of alignment of the distal 156 end of the arm 154 with the tab 164 of the actuator.

The present invention also provides for the improved ease of assembly of a disc drive through providing a plurality of engagement tabs which engage a plurality of extending boss members in the basedeck and a plurality of fasteners which provide for the flushing engagement of the pole piece on the basedeck. As illustrated in FIG. 7, the boss members form a triangular shape and the fastener receiving apertures are disposed within the interior boundary of the triangle, in close proximity to corresponding boss members. More specifically, receiving aperture 192 is in close proximity to boss 186 and receiving aperture 194 is in close proximity to boss 188.

During the installation of the pole, the multiple engagement tabs are disposed into the boss members. Due to variations in the manufacturing of the pole piece and the boss members and the engagement tabs, the pole piece is usually not perfectly flush with all three bosses. Prior art assembly methods for installing the pole to the basedeck often required extreme precision in the insertion of fasteners and other components to deliver a flush engagement of the pole to the basedeck within the manufacturing tolerances. The present invention overcomes this limitation through the strategic placement of the fastener engagement apertures in relation to the boss members, as described above and illustrated in FIG. 7.

FIG. 8 illustrates a perspective view of the FIG. 7 along the line 8—8, with the inclusion of a pole 134 having a fastener 196 inserted thereon, through the pole and into the basedeck. When both fasteners are inserted into the basedeck receiving apertures, the combination of fasteners in relation to the boss members causes the pole to rotate in a direction designated by 198. The rotational force causes the third engagement tab to flushingly contact the third boss member 190. Thereby, the fasteners not only secure the engagement tabs proximally disposed, but also properly engage the final engagement tab to the remaining boss member without adversely affecting other boss members. The assembly method of the present invention reduces assembly difficulties by eliminating tolerance inaccuracies through the strategic location of fasteners and boss members on the basedeck.

FIG. 9 provides a side view of a pole 134 constructed in accordance with the present invention, having the end stop 126 disposed thereon. The pole 134 also contains a latch mechanism 200 disposed between the magnet 136 and the back edge of the pole. In the preferred embodiment, the latch 200 positionably rotates to latch the actuator assembly when the heads are positioned over the landing zone and the drive is inactive.

FIG. 9 illustrates the spatial relationship of the various components on the pole and provides a side view of the outer stop 126. This view illustrates the upward extension of the post 152 from the base 150 and the tapering extension of the arm 154 from a maximum thickness at the end attached to the post 152 to a minimal thickness at its distal end. FIG. 9 also provides an illustration of the distinction between the two components on the distal end of the arm 154, specifically the contact surface 156 and the tab portion 158. In the preferred embodiment, the tab portion 158 extends above the rotational path of the actuator and provides a surface for the application of a manual displacement force, not from the actuator assembly, against the outer stop 126, allowing the heads to be de-merged.

In relation to the disc drive assembly as discussed above, FIG. 9 also illustrates the third engagement feature 202 disposed on the posterior side of the pole 134. In relation to FIG. 8, this engagement feature will be disposed in boss member 190. During the installation process, this engagement feature 202 will be flushingly disposed in relation to the boss member 190 in response to the rotational force 198 created by the fasteners.

The present invention includes an end stop assembly (such as 126) for limiting the travel of an actuator (such as 112) in a disc drive, the actuator pivotally supported by an enclosure (such as 102) for movement of a read/write head (such as 120) in data reading and writing relationship to a data disc (such as 108). The end stop assembly comprises a base plate (such as 150) fixedly positioned within the enclosure, a post (such as 152) extending upward from the base plate and a cantilevered arm (such as 154) extending outward from the post. The arm comprises a proximal end connecting the arm to the post and a distal end (such as 156) for providing contacting engagement with the actuator. Furthermore, the cantilevered arm is displaceable in a rotational direction substantially about the post and deformable in a direction substantially along its longitudinal axis (such as 162).

FIG. 10 provides a flow chart of the steps taken to properly assemble a disc drive using the outer stop and the insertion process of the present invention. This flow chart illustrates the steps taken to provide the flushing engagement of the pole piece with the outer stop of the present invention press fitted thereon. Furthermore, the flow chart of FIG. 10 illustrates the steps taken to merge the heads onto the disc using one of the inherent advantages of the end stop, specifically the displacement of the arm by the actuator assembly to allow its unencumbered rotation during head merging.

In accordance with the preferred embodiment, the method of assembly 210 begins with the press fitting of the outer stop onto the pole piece (step 212), prior to the disc drive assembly process. During the fitting of the outer stop on the pole, an engagement tab contacts and extends through an aperture in the pole itself. In the step 214, the pole with the end stop thereon, is inserted onto the basedeck, with the engagements features disposed on the posterior side of the pole engaging the plurality of boss members in the basedeck. Next, fasteners are inserted through apertures in the pole piece and into the basedeck 216. As described above, the fasteners, through the position with respect to the boss members, provide for the flushing engagement of all of the engagements tab with the boss members.

Once the pole has been secured to the basedeck, the actuator assembly may then be installed onto the basedeck, step 218, about a cartridge bearing assembly. With the end stop already installed within the drive in step 214–216, the heads positioned on the actuator assembly may then be merged onto the discs, step 220. Due the positioning the tab portion of the actuator being inside the arcuate curvature of the cantilevered arm of the outer stop in step 218, the tab portion exerts a displacement force against the distal end of the outer stop as the heads are merged. The tap portion of the actuator displaces the arm, allowing the actuator rotate thereby. Once the heads have been merged onto the discs, the tab portion ceases contact with the distal end of the arm and a displacement force is no longer asserted thereon. At step 222, the inherent biasing force of the arm causes the arm to rotate back to its original position, thus back within the rotational path of the actuator assembly and providing a limit stop for the rotation of the actuator. Thus, the outer stop has been press-fitted onto the pole, flushing disposed within the disc drive prior the installation of the actuator assembly, and the heads have been merged over the discs without requiring manual displacement of the outer stop, step 224.

For the purpose of the appended claims, the means for limiting is defined as the outer stop of the present invention, specifically the combination of the base plate having a post extending therefrom with a cantilevered arm extending outward from the post and the arm having a contact plate on the distal end for contacting engagement with a contact tab of an actuator assembly to allow the actuator to displace the arm during the merging of the heads onto the disc, the arm also has a variable thickness tapering in width from a maximum thickness at the proximal end connected to the post to a minimum thickness at the distal end and the arm also contains a tab portion extending upward from the distal end in close relation to the contact plate for manual rotational displacement of the arm about the post.

It is to be understood that even though numerous characteristics and advantages of various embodiments of the present invention have been set forth in the foregoing description, together with details of the structure and function of various embodiments of the invention, this disclosure is illustrative only and changes may be made in details especially in matters of structure and arrangements of parts within the principles of the present invention to the full extent indicated by the broad general meaning of the terms in which the appended claims are expressed.

What is claimed is:

1. An end stop assembly for limiting the travel of an actuator in a disc drive to an end stop position, the actuator pivotally supported by an enclosure for movement of a read/write head in data reading and writing relationship to a data disc, the end stop assembly comprising:

a base plate adapted to be fixedly positioned within the enclosure;

a post extending from the base plate; and a cantilevered arm extending outward from the post, the arm comprising a proximal end rigidly connecting the arm in a non-rotational relationship to the post and a deflectable distal end for providing contacting engagement with the actuator, the distal end and a medial portion of the cantilevered arm being displaceable in a rotational direction substantially about the post to facilitate movement of the actuator beyond the end stop position and deformable in a direction substantially along a longitudinal axis of the cantilevered arm to limit the travel of the actuator to the end stop position both while the proximal end is held in a fixed, non-moving position.

2. The end stop assembly of claim 1 wherein the cantilevered arm comprises a compressible curved beam.

3. The end stop assembly of claim 2 wherein the cantilevered arm has a non-uniform thickness tapering from a maximum thickness at the proximal end to a minimum thickness at the distal end.

4. The end stop assembly of claim 2 wherein the compressible curved beam is constructed of polyetherimide.

5. The end stop assembly of claim 2 wherein the compressible curved beam is constructed of polyphenylsulfone.

6. The end stop assembly of claim 2 further comprising:
an arcuate shaped contact plate disposed at the distal end of the cantilevered arm.

7. The end stop assembly of claim 6 wherein the contact plate further comprises:
a tab portion for receiving the displacement force so as to rotationally displace the arm about the post to allow the actuator to fully rotate without contacting engagement with the end stop assembly.

8. A disc drive comprising:
an enclosure supporting a rotatable data disc;
an actuator pivotally supported within the enclosure adjacent the data disc; and
the actuator rotatable by a voice coil motor to position a read/write head supported by the actuator to selected positions between a desired inner extent and an outer extent of travel corresponding to a band of data storage locations on the data disc, a selected one of the inner and outer extents of travel of the actuator determined by an end stop comprising:
a base plate fixedly positioned within the enclosure;
a post extending from the base plate; and
a cantilevered arm extending outward from the post, the arm comprising a stationary proximal end rigidly connecting the arm in a non-rotational relationship to the post and a deflectable distal end for providing contacting engagement with the actuator, the distal end and a medial portion of the cantilevered arm being displaceable in a rotational direction substantially about the post to facilitate movement of the actuator beyond the selected one of the inner and outer extents and deformable in a direction substantially along a longitudinal axis of the cantilevered arm to limit the travel of the actuator to the selected one of the inner and outer extents both while the proximal end remains affixed in a stationary relationship with respect to the post.

9. the disc drive of claim 8 wherein the cantilevered arm is a compressible curved beam.

10. The disc drive of claim 9 wherein the cantilevered arm has a non-uniform thickness tapering from a maximum thickness at the proximal end to a minimum thickness at the distal end.

11. The disc drive of claim 9 wherein the compressible curved beam is constructed of polyetherimide.

12. The disc drive of claim 9 wherein the compressible curved beam is constructed of polyphenylsulfone.

13. The disc drive of claim 8 further comprising an arcuate shaped contact plate disposed at the distal end of the cantilevered arm.

14. The disc drive of claim 8 wherein the contact plate has a tab portion for receiving the displacement force to displace the distal end and the medial portion of the arm about the post thereby allowing the actuator to fully rotate without contacting engagement with the end stop.

15. A disc drive comprising:
an actuator having an axis of rotation; and
means for limiting the rotation of the actuator past an outer extent.

* * * * *